A. HARPER & L. W. CROSS.
SPRING-SCALE.

No. 171,016. Patented Dec. 14, 1875.

WITNESSES:
Francis McArdle
Alex F. Roberts

INVENTORS.
A. Harper
BY L. W. Cross
ATTORNEYS.

UNITED STATES PATENT OFFICE.

ABRAM HARPER AND LAROY W. CROSS, OF EDGERTON, OHIO.

IMPROVEMENT IN SPRING-SCALES.

Specification forming part of Letters Patent No. 171,016, dated December 14, 1875; application filed October 29, 1875.

*To all whom it may concern:*

Be it known that we, ABRAM HARPER and LAROY W. CROSS, of Edgerton, Williams county, Ohio, have invented a new and Improved Combined Measure and Weighing-Scale, of which the following is a specification:

Our invention consists of a contrivance of levers and springs for the support of the measure, so arranged that the weight of the contents of the measure will be indicated on a scale, the levers and spring being concealed in an inclosed base, which protects the apparatus from injury.

Figure 1:
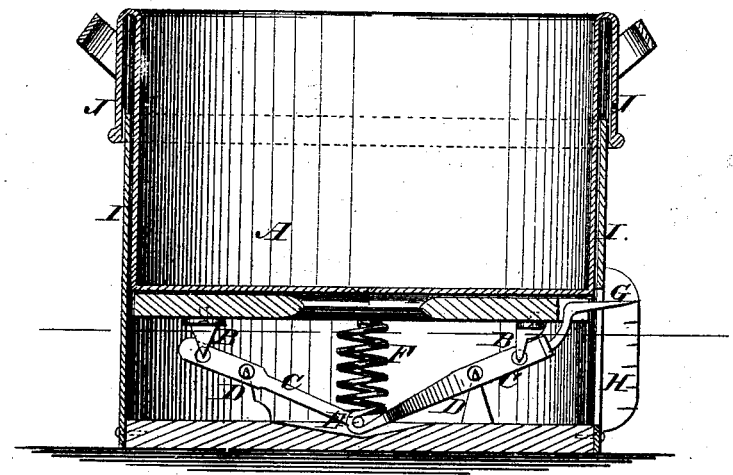
Figure 2:
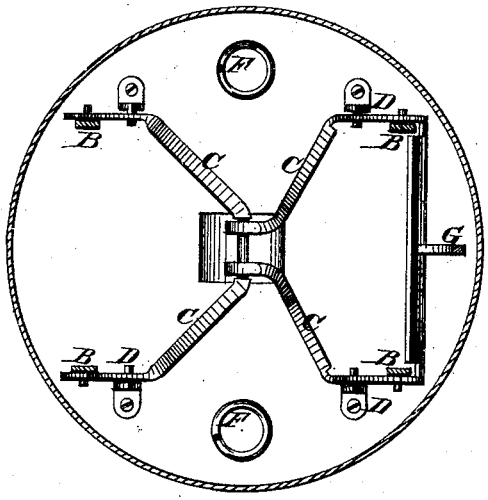

Figure 1 is a sectional elevation of our improved measure; and Fig. 2 is a horizontal section taken on the line $x\ x$, Fig. 1.

Similar letters of reference indicate corresponding parts.

A represents the measure, which rests by the knife-edge pivots B on the levers C, which are similarly pivoted at D, and are also coupled together at E between the springs F, and one has a pointer, G, by which the weight is to be indicated on the scale H.

The springs are compressed by the bottom of the measure when pressed down by the weight in the measure; and they are graduated to the scale, so as to register the weight correctly.

The measure and the weighing apparatus are arranged in a case, I, which is for the protection of the apparatus; and the top of the measure is turned down over the top of the case at J, to prevent the space between the measure and the case from filling up.

Having thus described our invention, we claim as new and desire to secure by Letters Patent—

1. The combination, with the measure A, of the knife-edge pivots B, levers C, spring F, pointer G, and scale H, substantially as specified.

2. The combination of case I, measure A, and the weighing-levers and spring, substantially as specified.

ABRAM HARPER.
LAROY W. CROSS.

Witnesses:
 L. H. STOCKER,
 ALVAH CARPENTER.